INVENTORS
R. G. COWAN
D. F. STEWART

United States Patent Office 3,536,797
Patented Oct. 27, 1970

3,536,797
**METHOD FOR EXTRUDING A FOAMED POLY-
OLEFIN RIBBON HAVING A HIGH GLOSS
SURFACE FINISH**
Royce G. Cowan and Dan F. Stewart, Bartlesville, Okla.,
assignors to Phillips Petroleum Company, a corporation of Delaware
Continuation-in-part of application Ser. No. 544,361,
Apr. 22, 1966. This application Apr. 28, 1967, Ser.
No. 634,464
Int. Cl. B29d 7/04, 27/00
U.S. Cl. 264—51                                      5 Claims

ABSTRACT OF THE DISCLOSURE

Accurately dimensioned foamed oriented thermoplastic film having an exceptionally high gloss surface finish is produced by forming a molten film containing either compressed gas or chemical foaming agent sufficient to foam the molten film, immediately quenching the film and heating it to the orientation temperature of the thermoplastic on a smooth uniform heating surface, and stretching the film along its longitudinal axis in this heated condition to impart the desired orientation thereto.

---

This application is a continuation-in-part of our copending application, Ser. No. 544,361, filed Apr. 22, 1966, and now abandoned.

Highly oriented smooth thermoplastic films generally possess high gloss surface characteristics or surface sheen that lends considerable utility to the application of such films for decorative purposes such as, for example, ribbons and packaging material. We have found that additional utility and decorative quality can be realized through the use of foamed oriented thermoplastic films, particularly polyolefin thermoplastic films, where sufficient care is taken during the manufacture of these films to avoid distortion of the film surface either during extrusion, foaming or reheating and/or orientation and that surface irregularities which do result during the extrusion and foaming steps can be substantially eliminated in the subsequent reheating operation to produce a decorative foamed and uniaxially oriented polyolefin film having exceptionally high gloss surface and having particular utility as decorative ribbon.

It is therefore an object of this invention to manufacture a foamed oriented thermoplastic film having a high gloss surface finish. It is another object of this invention to manufacture a foamed oriented polyolefin film having a density at at least one surface substantially higher than the average density, said surface having an exceptionally high gloss finish. It is another object of this invention to provide a method for producing foamed oriented thermoplastic film having a surface finish of exceptionally high sheen. It is yet another object of this invention to provide a method for producing oriented foamed high gloss surface films from polyolefins of 1-olefin monomers having from 2 to about 4 carbon atoms.

Other aspects, objects and the several advantages of this invention are apparent to one skilled in the art from a study of this disclosure and the appended claims.

In accordance with one embodiment of this invention, a thermoplastic melt containing a suitable foaming agent is extruded to form a thin film which is passed, preferably downward, into a quench zone where the temperature of the film is reduced below the melting point of the thermoplastic. The film is then heated to its orientation temperature while supported on a uniform smooth heating surface and then stretched to impart the desired orientation.

We have further discovered that a finished product having further improved properties and appearance can be obtained by slitting the quenched film, either during or immediately following the quenching operation, to produce a foamed, unoriented film or ribbon having a lateral dimension of up to about 10 inches. We have found that substantial improvement in physical properties and appearance of such ribbons is obtained on reheating and orienting without further reduction in film size by slitting. The amount of "neck in," e.g., reduction in lateral dimension of the films of this embodiment is relatively greater than that obtained with initially wider films. A narrower, more compact cell structure is found to result, particularly the outer lateral extremities. In addition, these narrower films result in products having significantly higher densities than those produced from foamed, unoriented films having substantially greater lateral dimension. As a result, these preferred films or ribbons are found to possess improved surface texture and color retention than products drawn from films of substantially greater initial width.

The film can be extruded in either planar or tubular form, although the latter method is generally preferred. Whether the film is extruded in planar or tubular form it can be slit to form one or more planar films either in the quench zone or immediately following the quenching operation and before the reheating and orientation steps. Where the tube is slit in the quench zone, suitable provision should be made to avoid resealing of the slit tubing by directing the course of the film so as to avoid contact of the free ends before sufficient cooling has taken place.

Any thermoplastic resin capable of being foamed and oriented is suitable for application in the concept of this invention although olefin polymers and copolymers are generally preferred. The polymers found most suitable for this application are those derived from 1-olefin monomers having from 2 to about 4 carbon atoms, particularly polypropylene and polyethylene. The polymers employed should further have sufficiently high molecular weights and crystallinity so that the desired orientation and surface characteristics of the finished product can be achieved. For instance, polypropylene having a melting point of from about 300 to 375° F., and containing at least about 50 weight percent isotactic polymer is quite suitable for use in this application.

The desired degree of foaming of the thermoplastic can be achieved either by the incorporation of a suitable chemical blowing agent in the thermoplastic melt or by the distribution of a suitable compressed gas in the melt prior to extrusion to effect the desired degree of foaming of the extruded film. Chemical blowing agents such as azo compounds, N-nitroso compounds, and sulfonyl hydrazides are suitable to achieve the desired result. However, where polypropylene is employed as the thermoplastic resin it is generally preferred to use azobisformamide as the chemical blowing agent. Where it is desired to effect foaming by incorporating a compressed gas in the thermoplastic melt prior to extrusion, it is only essential that the gas be relatively inert toward the polymer and possess physical characteristics sufficient to effect the desired degree of foaming. Where olefin polymers are employed it is generally desired to use as the physical blowing agent a light hydrocarbon gas, particularly butane, or an inert gas such as nitrogen, helium, etc.

Pigments, stabilizers, dispersing agents, foaming modifiers and other additives may be added either to the polymer melt or to the particulate polymer to obtain the desired product with the provision that the nature of these additives and the amounts employed do not significantly impair the necessary physical characteristics of the polymer and detract from the surface quality of the final product.

Extrusion temperature can vary widely depending on the viscosity and melting point of the thermoplastic and the temperature at which the foaming agent is activated. Generally the temperature of initial activation of the foaming agent is substantially below the extrusion temperature which generally ranges from about 225 to about 700° F. for the polymers employed. Generally, where the thermoplastic is polypropylene and the foaming agent is azodicarbonamide, which decomposes at about 385° F., the melt temperature will be from about 400 to about 475° F.

The distance between the die head and the quench zone should be relatively short in that substantial distortion of the film surface as well as excessive foaming results where the molten film must traverse any considerable distance before it is quenched and cooled below its melting point and the activation temperature of the foaming agent. The distance between the die head and the quench zone can, of course, vary considerably depending upon the rate of extrusion and, consequently, the rate of travel of the polymer film and the physical characteristics of the thermoplastic employed. However, it is generally preferred in most applications to space the die head from the quench zone, which generally consists of a water bath, by a distance of from about 0.2 to about 2 inches where the velocity of the film travel is within the range of from about 0.1 to about 2 feet per second. In most instances any spacing substantially greater than this allows the foaming to become uneven. However, where velocity is increased at a given distance between die head and quench zone, there is a commensurate reduction in the degree of foaming due to the reduced time lapse. It is apparent therefore that it is necessary to correlate extrusion velocity and the distance between the die head and quench zone in order to minimize distortion and excessive foaming.

The quench zone or bath may comprise any liquid capable of conducting heat away from the molten film at a rate sufficient to effect cooling of the film below its melting point and below the activation temperature of the foaming agent within a reasonably short period of time. In most applications water can be suitably employed as the heat transfer medium in the quench zone. The temperature of the cooling bath can vary considerably depending upon the degree of cooling desired but will generally be in the range from about 32 to about 180° F. and preferably in the range of from about 80 to about 120° F. where the thermoplastic film is polypropylene.

The film can be slit at any point during this operation after extrusion and before reheating for orientation, but is preferably slit to form a planar film immediately after it emerges from the die. The necessity of slitting the tubular film is, of course, eliminated where a planar film is extruded directly into the quench bath. Care should be taken in slitting the film so that the freshly cut edges do not contact each other until they have been sufficiently cooled. The laminar film thus formed may be removed from the quench bath and collected on suitable rollers to be subsequently reheated and oriented, or it may be passed directly to orientation.

The orientation is preferably accomplished by heating the film to its orientation temperature and drawing the laminar film along its longitudinal axis to impart the desired uniaxial orientation thereto. Conventional means for heating the unsupported film is not at all desirable in this operation in that the polymers employed generally exhibit some flow characteristics at temperatures in the range of orientation temperature and, as a consequence, some distortion of the film surface inevitably results in such operations. It is essential, therefore, that the heating of the film prior to orientation be accomplished by supporting the film on a smooth uniform heat transfer surface, which surface is also preferably designed to move in a direction and at a velocity corresponding to the motion of the thermoplastic film in order to prevent slippage of the film over the heat transfer surface and the commensurate distortion that necessarily results at elevated temperatures. In the presently preferred embodiment of this invention the reheating means can consist of a heated "S" roll assembly. In such operations, the film is passed over a first heated cylinder for a distance equivalent to about one-half of the circumference of the first cylinder and is then drawn back over a similar second cylinder and travels over this second roll for a distance approximately equivalent to about one-half the circumference of the second roll. Obviously, such procedure subjects both sides of the film in the uniform manner to heating while supported on a smooth uniform surface in order to bring the film to its orientation temperature under conditions which essentially eliminate surface deformations. Although the film can be effectively heated by contacting only one side of the film with a heated roll for a sufficient period of time to achieve the desired temperature, it is presently preferred to contact both sides of the film either simultaneously or serially. This method of heating is effective not only in preventing curling or other deformation of the heated film, but is also sufficient to eliminate imperfections on either surface of the film which may result during extrusion, foaming or quenching. Conventional means of reheating unsupported film, such as by radiant heating or by passing the film through a hot water bath, are unsatisfactory in that during such operations the film tends to curl and does not possess the superior surface gloss that can be achieved by the preferred method described. For the most effective heating the temperature of the heating roll or rolls will, of course, vary considerably depending upon the nature of the thermoplastic material from which the film is produced. Where the thermoplastic is a polymer of 1-olefins having from 2 to 4 carbon atoms with melting points in the range of from about 225 to about 350° F., the orientation temperature will generally be from about 170 to about 310° F., in which case the temperature of the finishing or heating rolls is maintained, preferably, within the range of from about 190 to about 330° F. where the rolls are of such circumference and are operated at such a velocity that contact between the film surface and the rolls is maintained within the range of from about 0.5 to about 10 seconds.

The draw ratio and the subsequent orientation of the film is also subject to considerable variation depending not only upon the characteristics of the particular thermoplastic employed but also upon the desired qualities of the finished film. For example, the draw ratios of the preferred polyolefins are generally within the range of from about 3:1 to about 10:1, and in particular, where polypropylene is the major constituent of the film, the preferred draw ratio is generally within the range of from about 4:1 to about 7:1; i.e., it is generally preferred to draw the polypropylene film along its longitudinal axis from about 4 to about 7 times its original length.

The resulting film can be slit into ribbon of any desired width or can be employed in sheet form for packaging through the use of conventional wrapping nad heat sealing apparatus. As the high gloss foamed oriented film is also heat shrinkable, it can also be used not only in decorative packaging but also for protective purposes and heat insulation due to its resilience and low heat transfer qualities.

The features and advantages of the present invention will become more apparent from the following examples when taken in connection with the drawing wherein.

Figure 1:
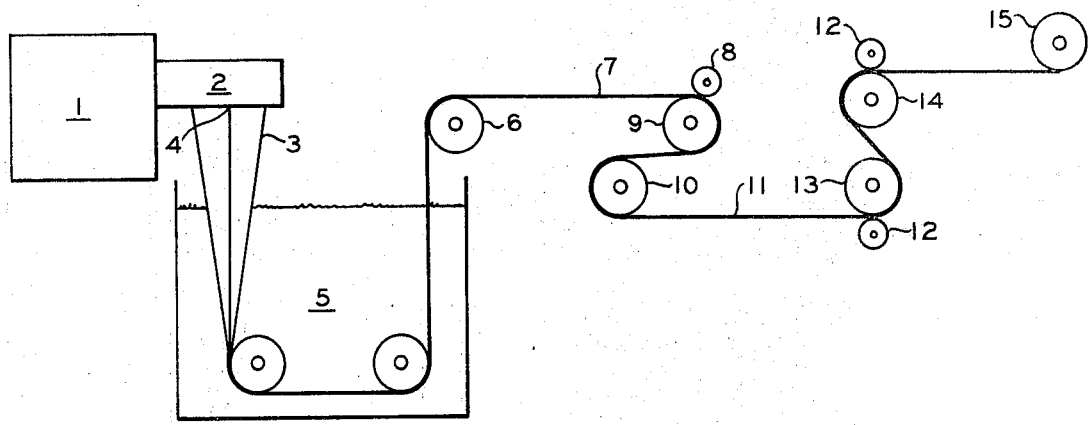
FIG. 1 is a schematic illustration of the process employed in Example I below.

Referring specifically to FIG. 1, a thermoplastic melt containing a suitable foaming agent is extruded from the extruder 1 through a tubular die 2 to form a foamed tube 3. A slitter 4 mounted at the die head parts the extrudate to form a planar film which is drawn through the quench tank 5 over the idler roller 6 into the unfolding zone 7 by the driven heating rolls 9 and 10. The quenched film passes between the nip roll 8 and the first driven heating roll onto the heating rolls where it is heated to its orientation temperature. The heated film is then pulled through the orienting zone 11 by the driven rolls 13 and 14. These rolls driven at a higher speed than the heating rolls uniaxially orient the heated film by stretching it in the direction of the pull. The film passes between the driven rolls and the nip roll 12 into the take-up zone 15 where it may be slit to desired lateral dimensions.

Figure 2:
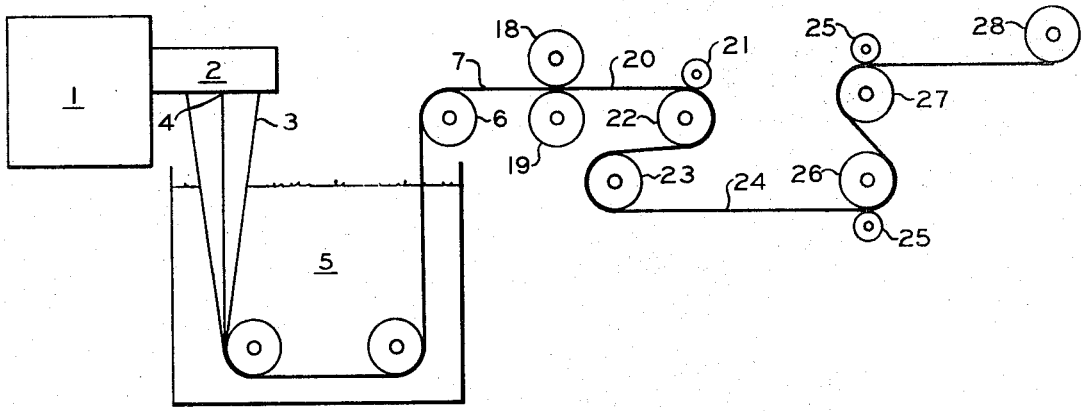
FIG. 2 is a schematic illustration of the process employed in Example II below.

Referring specifically to FIG. 2, the operation here is the same as FIG. 1 through the unfolding step except that driven pull rolls 18 and 19 move the film from the die through the quenching tank through the unfolding zone. The quenched unfolded film is then pulled through the slitting zone 20 by the driven heating rolls 22 and 23. Here the film is slit into ribbons of the desired lateral dimension. These film ribbons are drawn between the nip roll 21 and the first driven heat roll 22 onto the driven heating rolls where the ribbons are heated to their orientation temperature. Ribbons are then pulled by the driven rolls 26 and 27 to the orientating zone 24 where they are uniaxially orientated by being stretched because of the difference in the increased speed of the driven rolls in relation to the heating rolls. Ribbons pass between the driven rolls and the nip roll 25 into the take-up zone 28.

EXAMPLE I

Polypropylene having a melt flow of 4 measured at 230° C. and a specific gravity of 0.907 was compounded with 0.1 weight percent of a low molecular weight polyisobutylene dispersing agent, 0.3 weight percent azodicarbonamide, and 0.013 weight percent Harshaw 1058 red organic pigment was extruded downward to form a 6-inch diameter unblown tubular film having a wall thickness of about 15 mils after foaming and the tubing was passed directly into a water quench bath with the water surface being 0.75 inch below the outlet of the extrusion die. Die temperature was maintained at 375° F., polymer temperature at the die face was 420° F., film take-off speed was 18 feet per minute, and the average temperature of the water in the quench bath was about 120° F. The film was then slit into a flat web and passed serially around one-half the circumference of two heating and finishing rolls having a surface temperature of 285° F. and was drawn to 5 times its original length along its longitudinal axis to produce a 5 mil thick film having an exceptionally high gloss surface finish.

EXAMPLE II

The polypropylene film of Example I was slit to form ribbons of 1½-inch width prior to the reheating and orienting steps after which the individual ribbons were heated and oriented as described in Example I. The finished ribbons were found to have pronounced elongated cellular structure, particularly near the lateral extremities. These narrower ribbons had a density of 0.55 grams per cc. as compared to 0.45 grams per cc. for the products of Example I. In addition, the color of the narrower ribbons was markedly more distinct than that of the wider film of Example I. The narrower ribbons also possessed a distinctive lateral curl, e.g., uniform curvature across the width of the ribbon, which was not observed in the wider films of Example I.

We claim:

1. Method for producing an accurately dimensioned oriented foamed thermoplastic polyolefin film ribbon having high gloss surface finish, which method comprises:
    (a) extruding a molten film from a polyolefin mass containing a foaming agent from a die head at a forming temperature sufficient to activate said foaming agent so as to reduce the density of said film;
    (b) passing said film into a quench zone spaced from said die head by a distance related to the extrusion velocity at said die head so as to provide a sufficient period of time between the extrusion of said film and the cooling of said film in said quench zone to effect a degree of foaming of lesser degree than that which would result in deformation of the thermoplastic film while maintaining said distance within a minimum in order to prevent buckling of said film prior to its introduction to said quench zone;
    (c) slitting said quenched film along its major length to form a plurality of ribbons having a lateral dimension of up to about 10 inches;
    (d) passing said plurality of film ribbons from said slitting zone and heating said film to its orientation temperature, while uniformly supported to prevent distortion of said film ribbons during said heating operation;
    (e) stretching the thus heated film uniformly along its major axis to impart uniaxial orientation thereto; and
    (f) cooling the thus oriented film to a temperature below its orientation temperature.

2. The method of claim 1 wherein said polyolefin is a polymer of at least one 1-olefin having from 2 to about 4 carbon atoms, said extrusion velocity is within the range of from about 0.1 to about 2 feet per second, and said distance between said die head and said quench zone is within the range of from about 0.2 to about 2 inches.

3. The method of claim 2 wherein said film is extruded as a thin wall cylinder from an inverted die head positioned from about 0.2 to about 2 inches above said quench zone, the unquenched film is slit as it leaves the die head to form at least 1 planar film.

4. The method of claim 2 wherein the melting point of said polyolefin is from about 225 to about 350° F., said forming temperature is from about 300 to about 760° F., said quench zone comprises a liquid medium at a temperature of from about 32 to about 180° F., said orientation temperature is from about 170 to about 310° F., said film is stretched from about 3 to about 10 times its original length.

5. The method of claim 4 wherein said polyolefin is polypropylene, the melting point of said polypropylene is from about 300 to about 375° F., the temperature of said quench zone is from about 80 to about 120° F., and the orientation temperature of said polypropylene is from about 170 to about 310° F.

References Cited

UNITED STATES PATENTS

| | | | |
|---|---|---|---|
| 2,720,680 | 10/1955 | Gerow | 264—209 XR |
| 2,767,435 | 10/1956 | Alles. | |
| 3,260,776 | 7/1966 | Lindstrom et al. | 264—209 XR |
| 3,299,192 | 1/1967 | Lux | 264—53 XR |
| 3,311,681 | 3/1967 | Cherney et al. | 264—53 XR |
| 3,317,363 | 5/1967 | Weber | 264—48 XR |
| 3,422,172 | 1/1969 | Dekker | 264—48 XR |
| 3,426,111 | 2/1969 | Simpson | 264—51 XR |

PHILIP E. ANDERSON, Primary Examiner

U.S. Cl. X.R.

264—48, 146, 210, 288